No. 870,910. PATENTED NOV. 12, 1907.
W. SPLITTGERBER.
HANDLE.
APPLICATION FILED MAR. 8, 1907.

Inventor
William Splittgerber,

Witnesses
Geo. Hickman
C. Bradway.

By Victor J. Evans
Attorney

UNITED STATES PATENT OFFICE.

WILLIAM SPLITTGERBER, OF WAYNE, NEBRASKA.

HANDLE.

No. 870,910.  Specification of Letters Patent.  Patented Nov. 12, 1907.

Application filed March 8, 1907. Serial No. 361,321.

*To all whom it may concern:*

Be it known that I, WILLIAM SPLITTGERBER, a citizen of the United States, residing at Wayne, in the county of Wayne and State of Nebraska, have invented new and useful Improvements in Handles, of which the following is a specification.

This invention relates to a crank handle for cream separators or other apparatus adapted to be manually operated by a crank, and the invention has for its principal object to provide a crank handle in which the handle proper is so connected with the crank arm that it can be turned to one side when not in use so as to be out of the way and take up little room.

A further object of the invention is to provide a device of this character of simple and durable construction, easy and inexpensive to manufacture and convenient to manipulate.

With these objects in view and others, as will appear as the description proceeds, the invention comprises the novel features of construction and arrangement of parts which will be more fully described hereinafter and set forth with particularity in the claims appended hereto.

Figure 1:
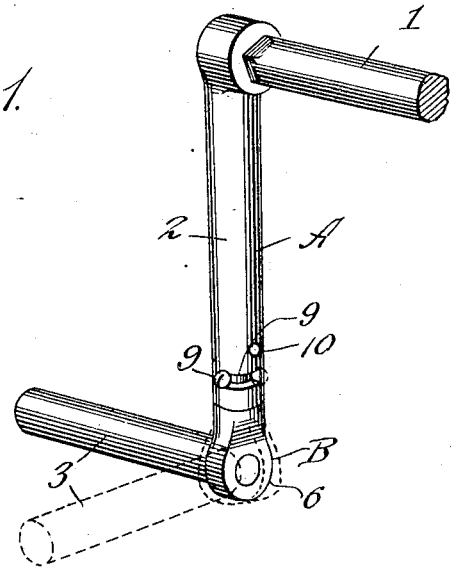
Figure 2:
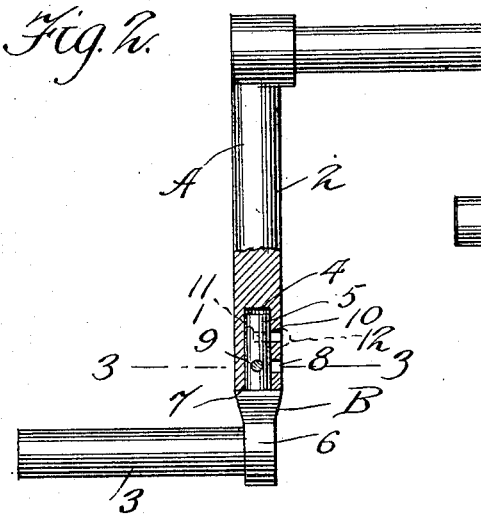
Figure 3:
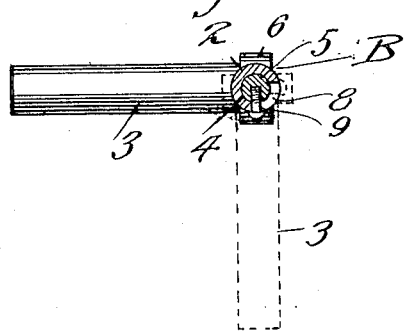

In the accompanying drawing, which illustrates one of the embodiments of the invention, Figure 1 is a perspective view of the crank handle showing the handle proper in normal and inoperative positions by full and dotted lines, respectively. Fig. 2 is a side elevation with a portion of the crank arm in section. Fig. 3 is a transverse section on line 3—3, Fig. 2.

Similar reference characters are employed to designate similar parts throughout the several figures.

Referring to the drawing, 1 designates a rotary shaft to which the crank handle is applied, the crank handle being composed of a crank arm 2 and a handle or grip 3 secured to the outer end thereof. The crank arm is preferably composed of two sections A and B arranged in telescoping relation so that the section B to which the grip 3 is attached may be adjusted with respect to the relatively rigid section A. The section A has an inwardly extending socket 4 at its outer end into which extends the shaft or shank 5 of the section B, which latter has a head 6 in the form of an eye, there being presented an annular shoulder 7 between the shank and head for engaging the end surface of the section A. The wall of the socket 4 has a transversely extending slot 8 slightly greater than ninety degrees and through this slot extends a screw or other removable fastening 9 that screws into the shank 5 to connect the sections of the crank arm together. By this means, the grip or handle proper 3 can be turned through an arc of ninety degrees into an out-of-way position. The socket has an aperture 10 in its wall that is adapted to register with the tapped opening 11 of the shank 5, as shown in Fig. 2, for receiving a screw (shown dotted) when it is desired to securely hold the handle or grip 3 rigidly in its normal position.

If desired, the screw 9 can be left permanently in place and a second screw employed for engaging in the openings 10 and 11 to hold the handle in rigid position or a single screw can be used interchangeably for connecting the crank arm sections loosely or rigidly together.

By removing the screw 9 and turning the section B of the crank arm through ninety degrees, the said screw can be inserted in the openings 10 and 11, as indicated by dotted lines at 12 in Fig. 2, so as to thereby hold the handle 3 in the dotted line position, Figs. 1 and 3.

From the foregoing description, taken in connection with the accompanying drawings, it will be seen that the present device is of simple and substantial construction and so arranged that the handle can be readily adjusted into an operative or inoperative position.

Having thus described the invention, what I claim is:—

1. The combination of a crank arm composed of sections, one section being provided with a socket, the wall of the socket having a quadrant slot and an aperture spaced therefrom, and the other section being provided with a shank having tapped openings adapted to register one with the slot and the other with the aperture, and fastening means adapted to be received in the openings of the shank and the slot and aperture of the socket for loosely or rigidly connecting the sections together.

2. The combination of a crank arm composed of two sections, one section being provided with a quadrant slot and with an aperture spaced from the slot, the other section having a shank provided with tapped openings adapted to register one with the slot and the other with the aperture, an interchangeable fastening adapted to extend through the slot and enter the opening of the shank registering therewith or to engage in the other opening and aperture, and a handle secured to one of the sections.

In testimony whereof, I affix my signature in presence of two witnesses.

WILLIAM SPLITTGERBER.

Witnesses:
 EMIL SPLITTGERBER,
 CAL RITCHEY.